US011914797B2

(12) United States Patent
Omata et al.

(10) Patent No.: US 11,914,797 B2
(45) Date of Patent: Feb. 27, 2024

(54) IMAGE DISPLAY APPARATUS FOR ENHANCED INTERACTION WITH A USER

(71) Applicant: SONY GROUP CORPORATION, Tokyo (JP)

(72) Inventors: Takanobu Omata, Tokyo (JP); Kaoru Koike, Tokyo (JP); Yuichi Miyagawa, Tokyo (JP); Hisataka Izawa, Tokyo (JP); Itaru Shimizu, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/755,116

(22) PCT Filed: Jul. 21, 2020

(86) PCT No.: PCT/JP2020/028274
§ 371 (c)(1),
(2) Date: Apr. 21, 2022

(87) PCT Pub. No.: WO2021/084817
PCT Pub. Date: May 6, 2021

(65) Prior Publication Data
US 2022/0365607 A1 Nov. 17, 2022

(30) Foreign Application Priority Data
Oct. 29, 2019 (JP) ................. 2019-196086

(51) Int. Cl.
*G06F 3/0346* (2013.01)
*G06F 3/01* (2006.01)
(52) U.S. Cl.
CPC ............ *G06F 3/0346* (2013.01); *G06F 3/016* (2013.01)

(58) Field of Classification Search
CPC ................... G06F 3/0346; G06F 3/016; G06F 2203/04802; G06F 1/1613; G06F 1/1652;
(Continued)

(56) References Cited

U.S. PATENT DOCUMENTS 1,558,585 A * 10/1925 Boykow ................ G01C 11/00
359/470
6,160,540 A * 12/2000 Fishkin ................. G06F 3/0414
345/184
(Continued)

FOREIGN PATENT DOCUMENTS

CN 108140383 A 6/2018
JP 2001197524 A * 7/2001
(Continued)

OTHER PUBLICATIONS

Yoshida, et al., "gCubik: A Cubic Autostereoscopic Display for Multiuser Environments—A 6-face Cube Prototyping and Interaction Considerations", Information Processing Society of Japan Interaction, Mar. 6, 2009, 08 pages.
(Continued)

*Primary Examiner* — David D Davis
(74) *Attorney, Agent, or Firm* — CHIP LAW GROUP

(57) ABSTRACT

Provided is an image display apparatus that includes a display displaying a three-dimensional image such that a three-dimensional object looks as if in a space defined by a member constituting an external surface and that the three-dimensional object is visible from multiple directions around the display, a motion detector detecting a motion of the display caused by an external force, a motion calculation unit calculating a motion of the three-dimensional object caused by the motion of the display based on the motion detected by the motion detector, a display control unit changing the three-dimensional image displayed on the display based on the calculation by the motion calculation (Continued)

unit, and a force sense control unit causing a force sense presentation unit to present a sense of force based on the calculation by the motion calculation unit.

10 Claims, 15 Drawing Sheets

(58) Field of Classification Search
CPC ........ G06F 1/1694; G06F 1/3231; G06F 3/03; G06F 3/03547; G06F 3/017; G06F 3/04815; G06F 3/04845; G06F 3/0485; G06F 3/04883; G03B 35/00; H04N 5/74
See application file for complete search history.

(56) References Cited

U.S. PATENT DOCUMENTS

| | | | | |
|---|---|---|---|---|
| 11,212,494 | B2* | 12/2021 | Yanez | .................... H04R 1/403 |
| 2008/0218515 | A1* | 9/2008 | Fukushima | .......... H04N 13/398 |
| | | | | 345/424 |
| 2010/0128112 | A1* | 5/2010 | Marti | ..................... G06F 3/011 |
| | | | | 348/E13.001 |
| 2014/0307064 | A1* | 10/2014 | Horimai | ............... H04N 13/393 |
| | | | | 348/51 |
| 2019/0138266 | A1* | 5/2019 | Takechi | .................. H04L 51/58 |
| 2019/0221043 | A1* | 7/2019 | Kopper | .................... A61B 6/03 |
| 2019/0391405 | A1* | 12/2019 | Takechi | ................. G03B 21/28 |

FOREIGN PATENT DOCUMENTS

| | | |
|---|---|---|
| JP | 2009-063879 A | 3/2009 |
| JP | 2018-014575 A | 1/2018 |
| KR | 10-2018-0030767 A | 3/2018 |
| WO | 2018/016095 A1 | 1/2018 |
| WO | 2018/163945 A1 | 9/2018 |

OTHER PUBLICATIONS

Kazuya Yanagihara , "Ryo Yokoyama—Providing an overwhelmingly moving experience through the fusion of sight, hearing, and tactile sensation", Haptic design, vol. 03, Sep. 4, 2017, 16 pages.
International Search Report and Written Opinion of PCT Application No. PCT/JP2020/028274, dated Sep. 15, 2020, 10 pages of ISRWO.

* cited by examiner

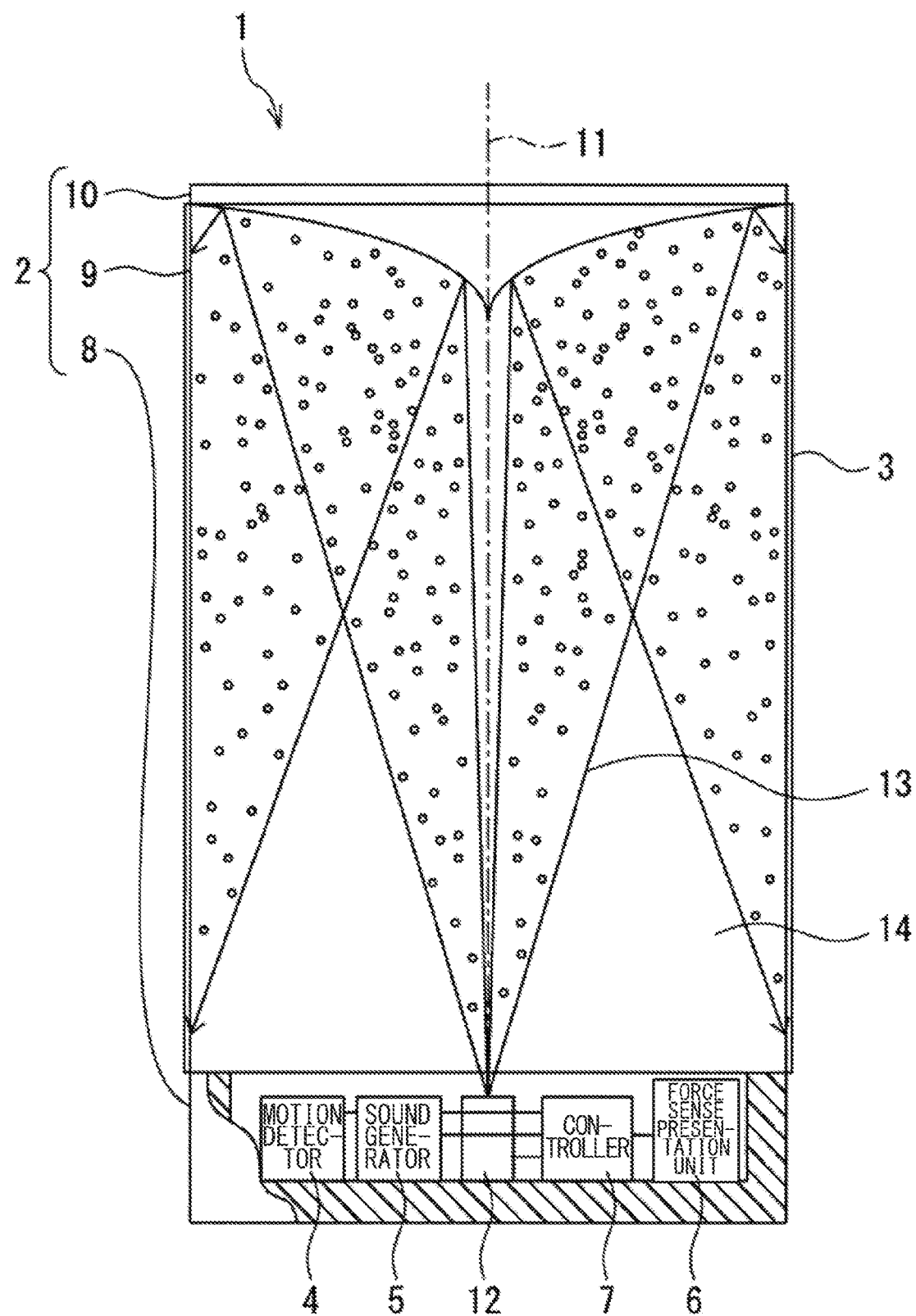
[FIG.1]

[FIG. 2]
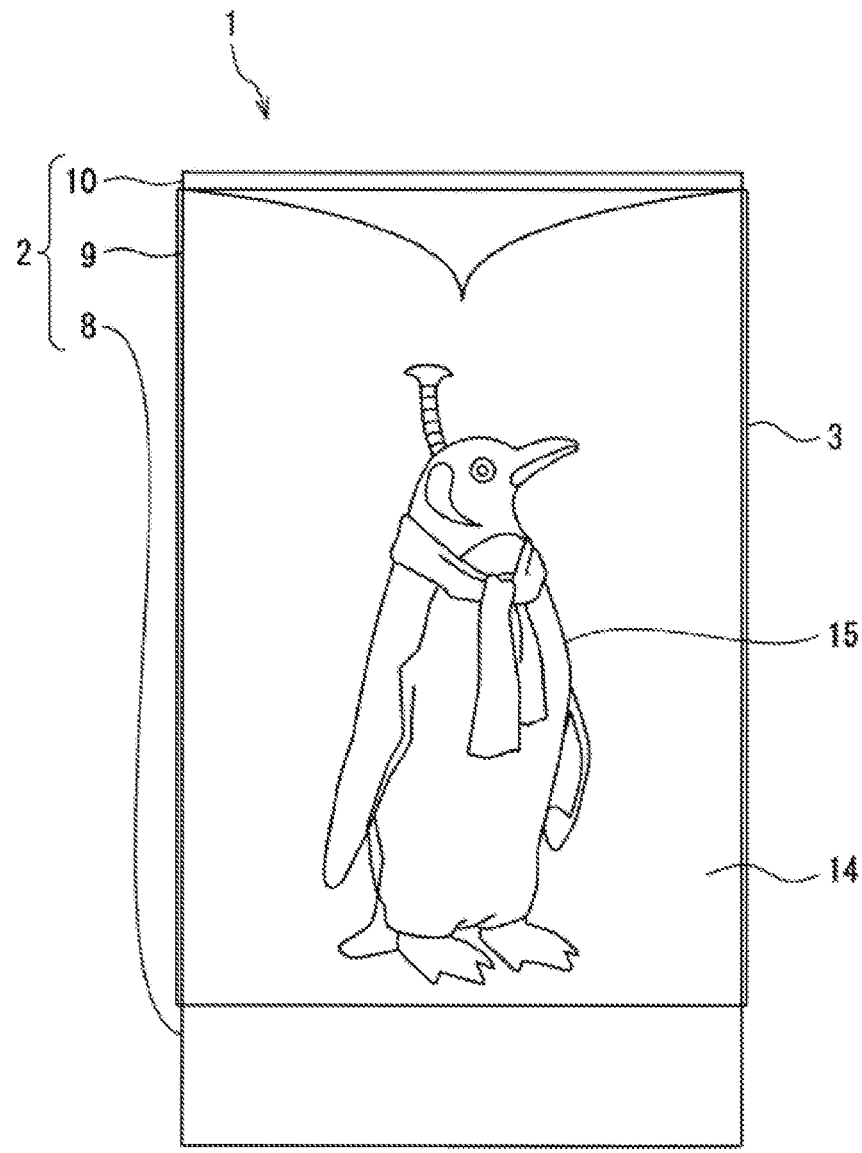

[ FIG. 3 ]
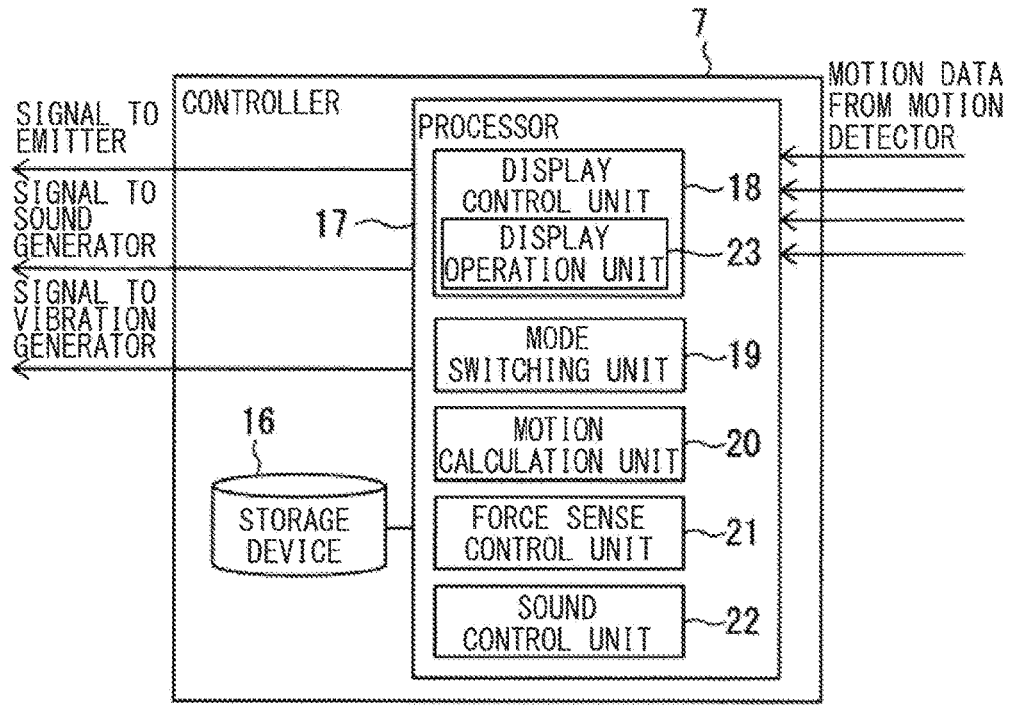
[ FIG. 4 ]
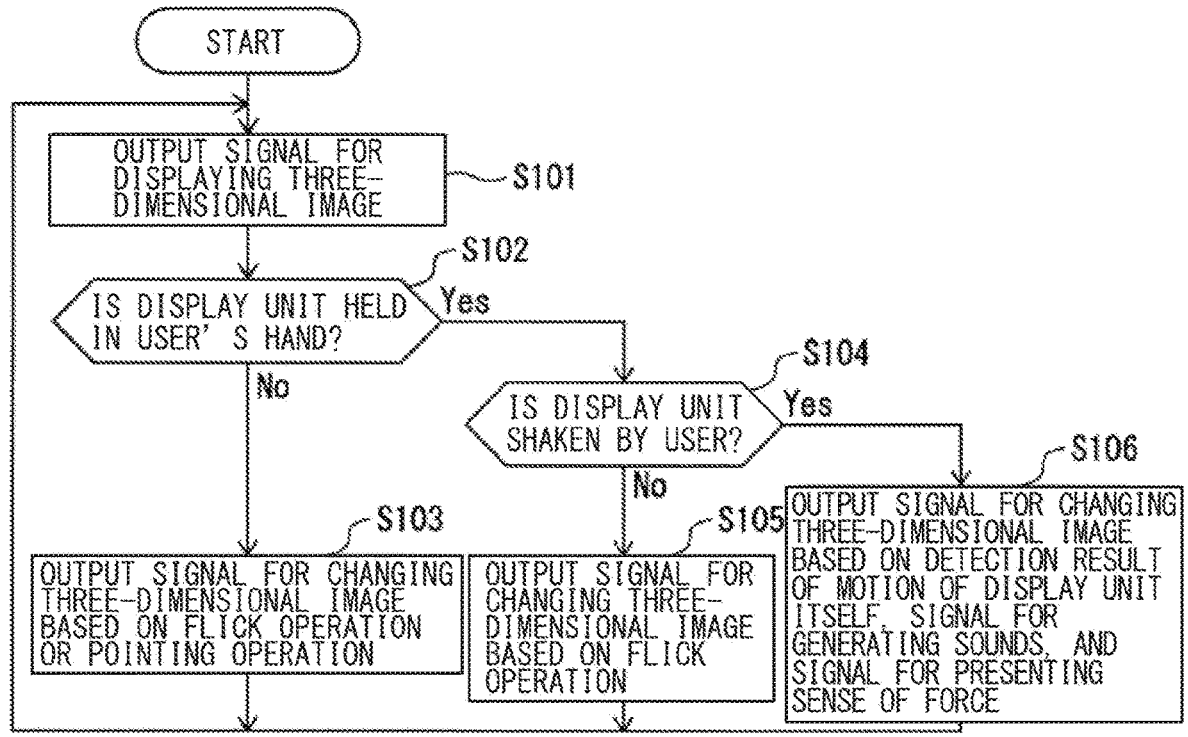

[FIG. 5]
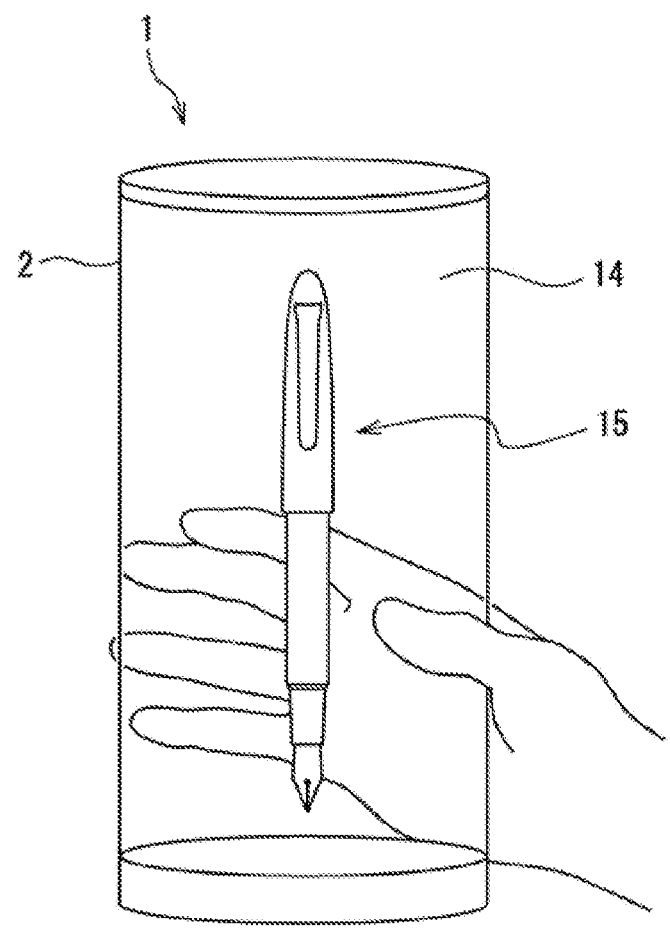

[FIG. 6]
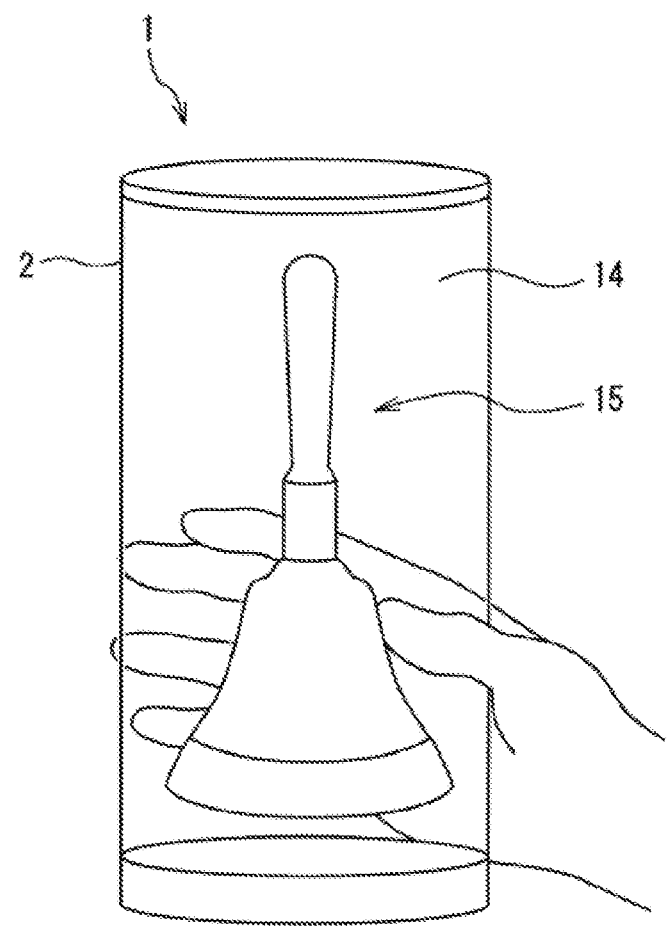

[FIG. 7]
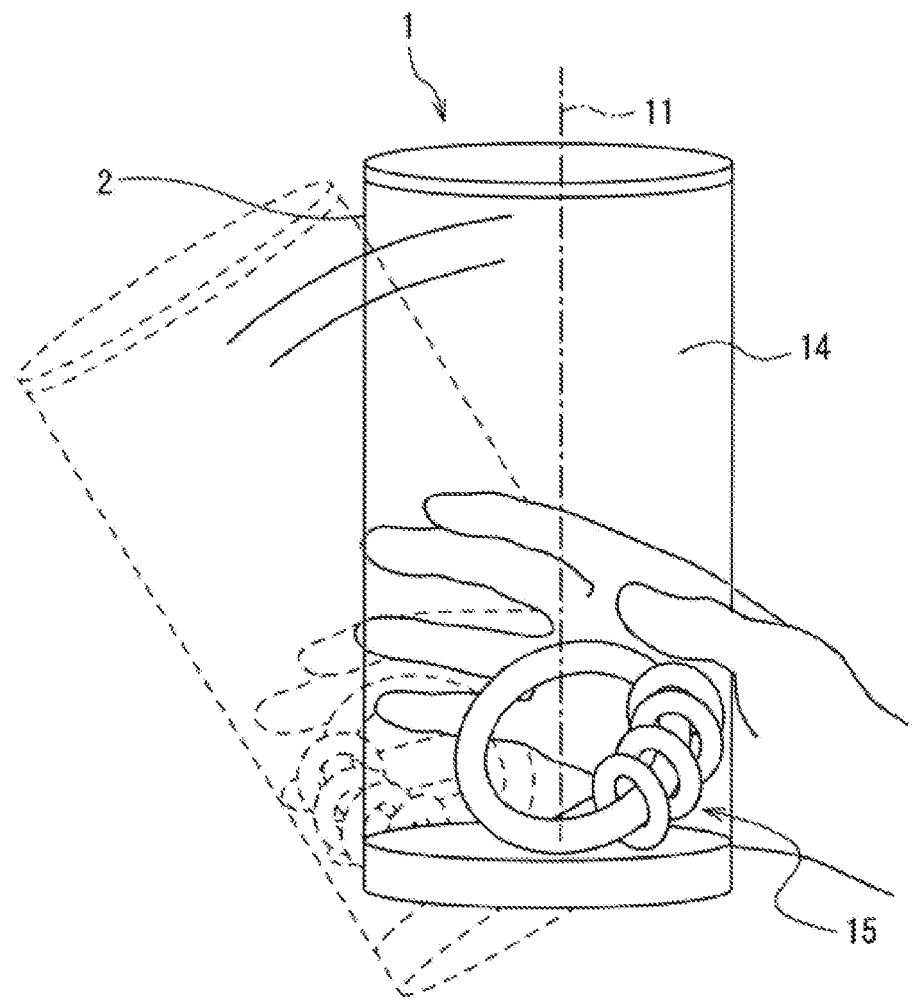

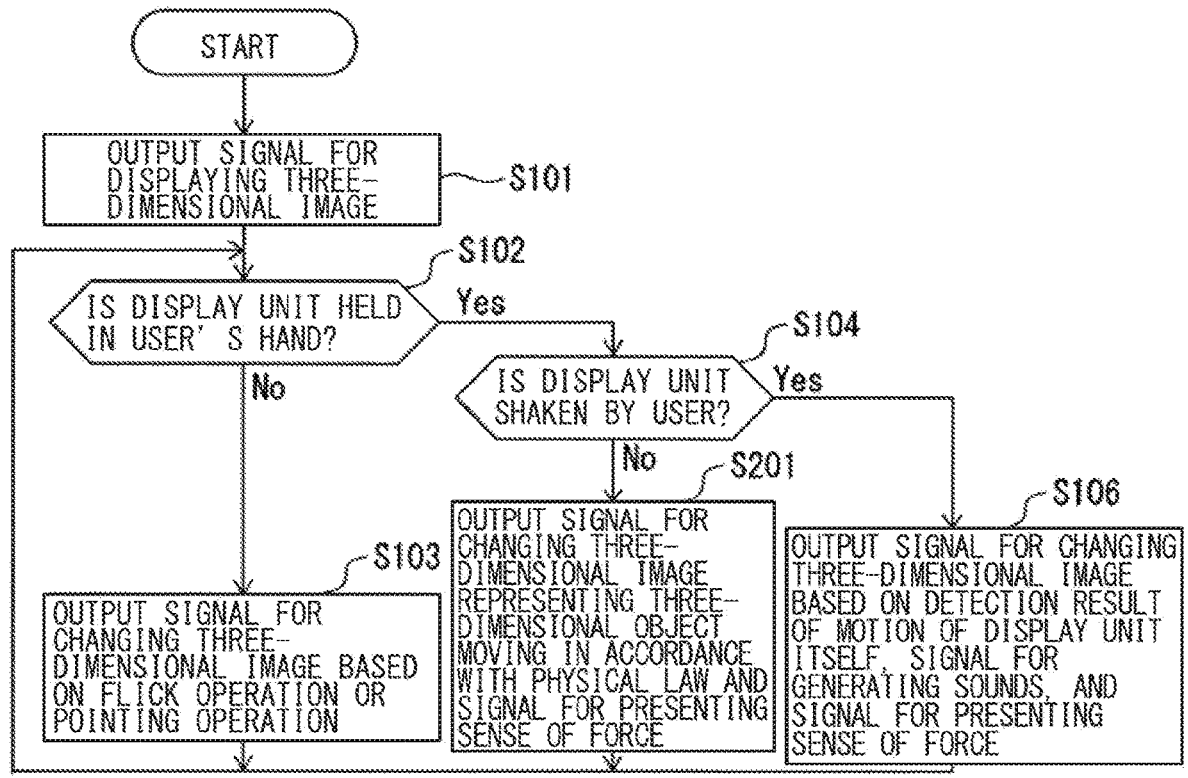

[FIG. 9]
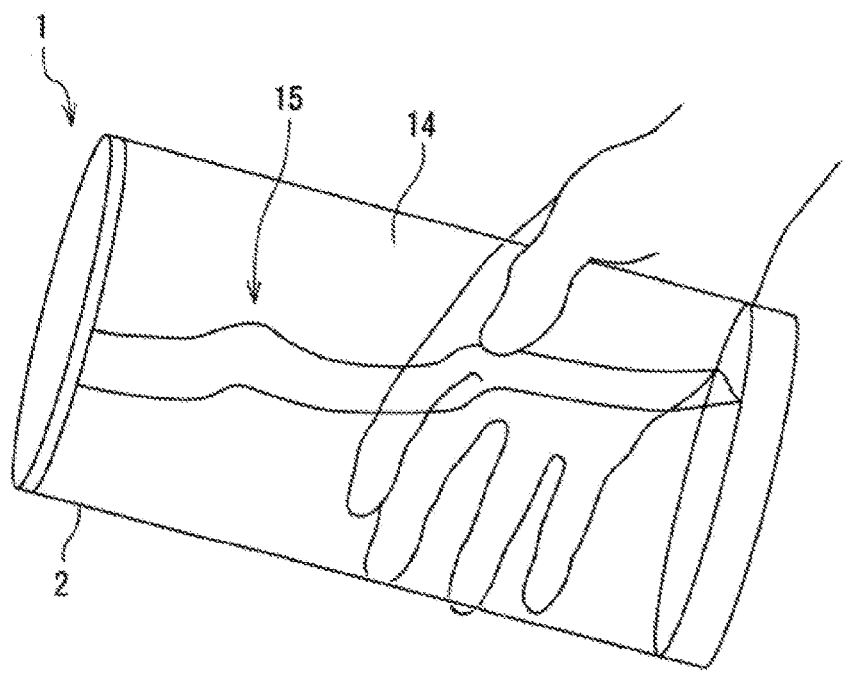
[FIG. 10]
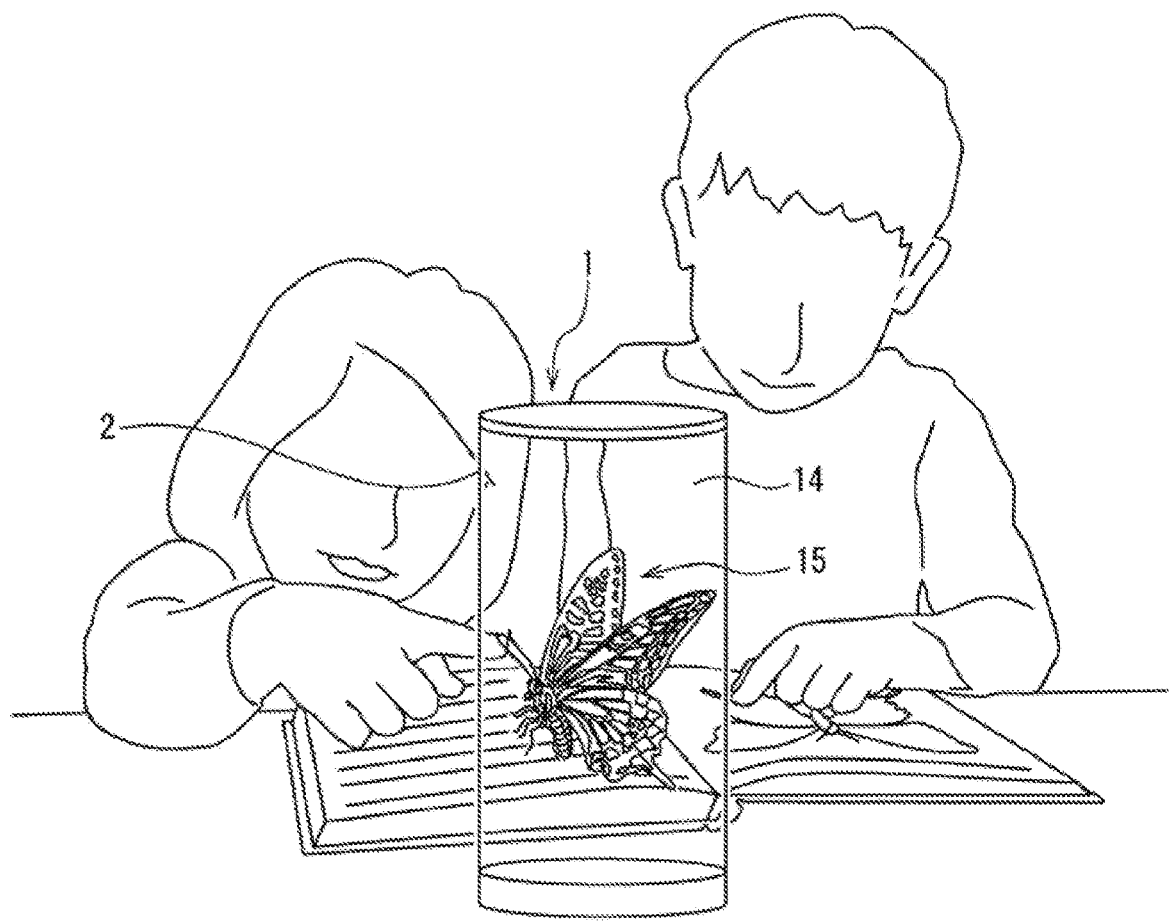

[ FIG. 11 ]
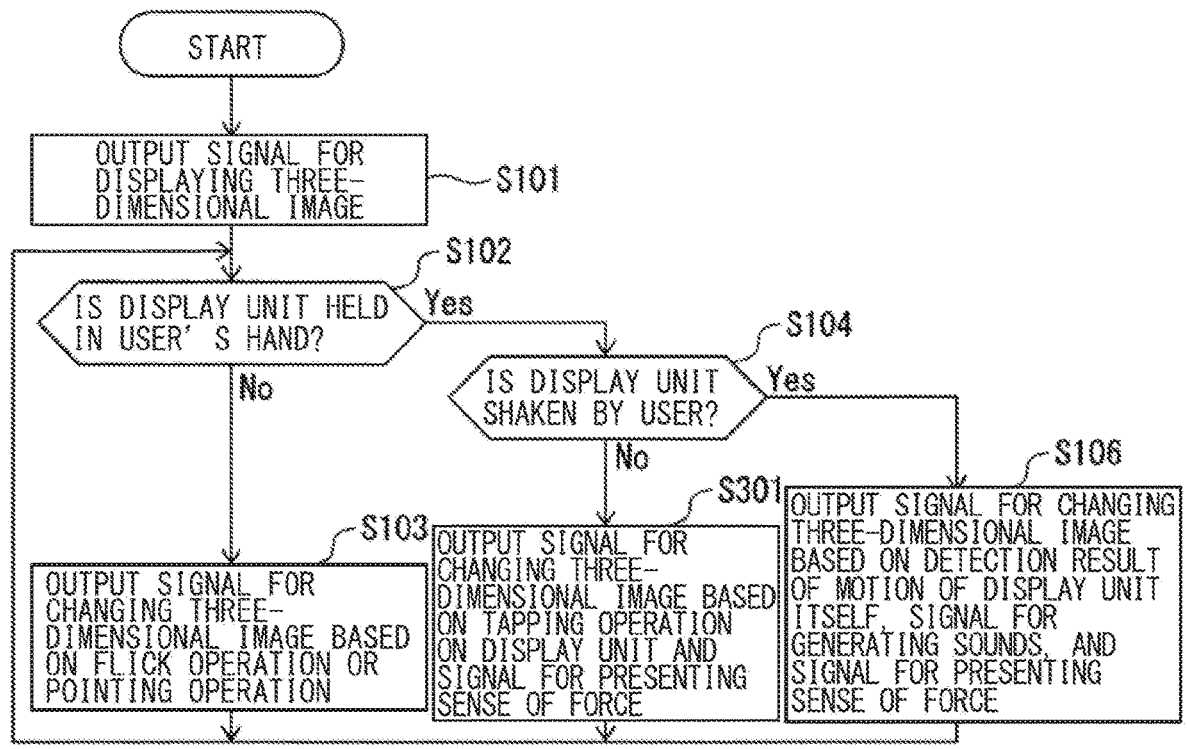

[ FIG. 12 ]
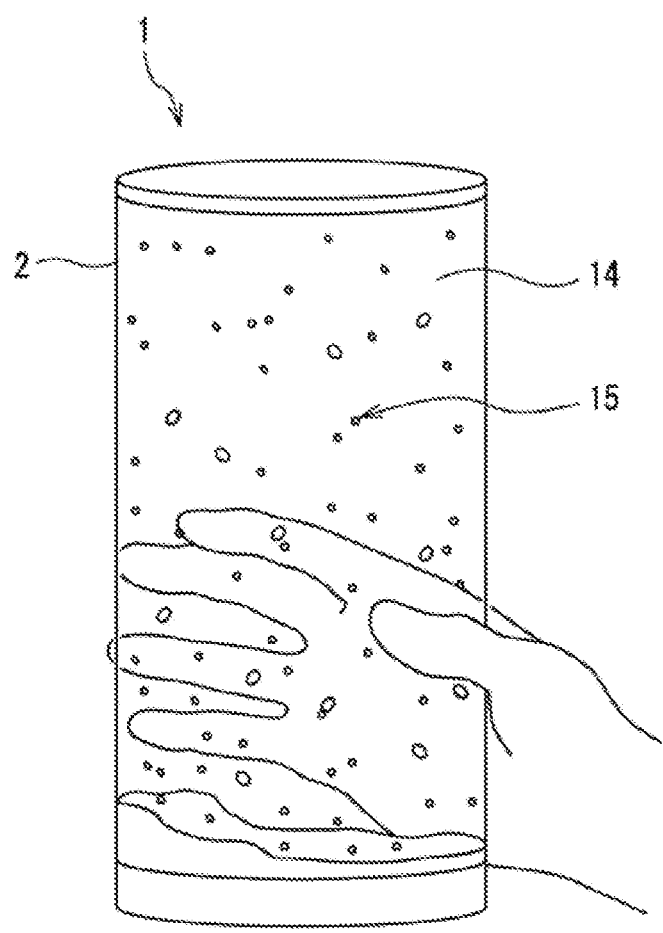

[ FIG. 13 ]
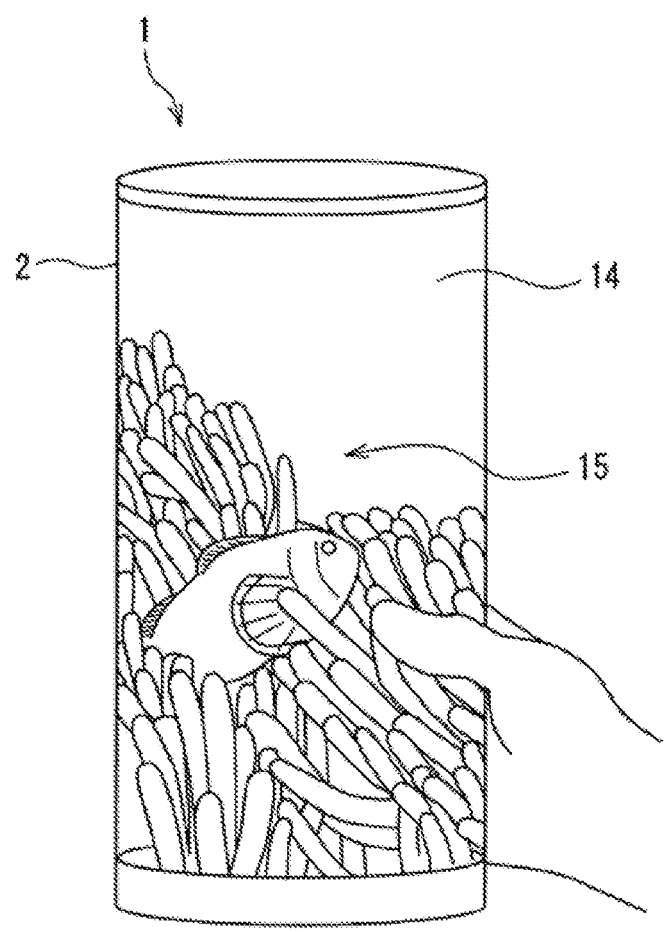

[ FIG. 14 ]
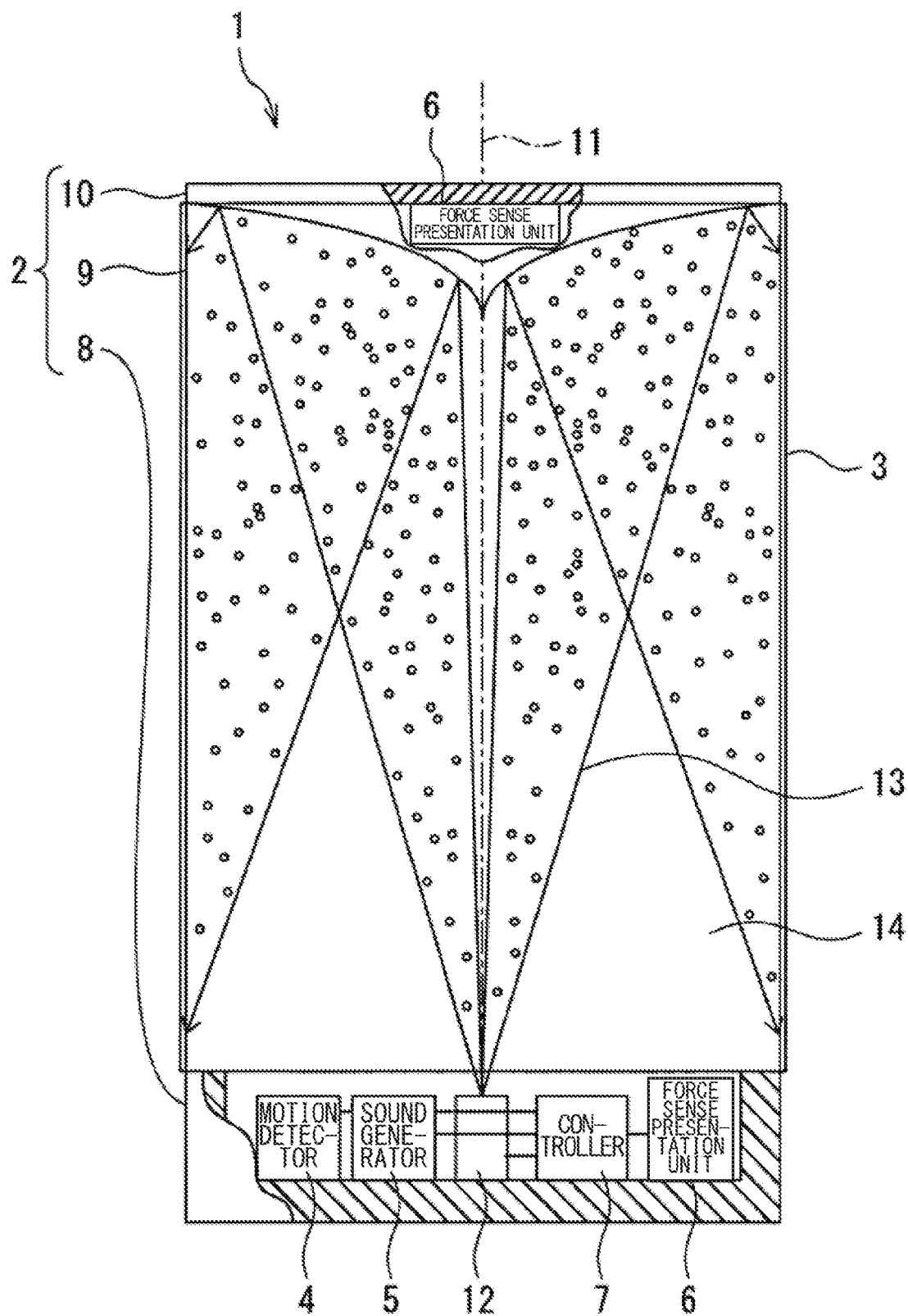

[ FIG. 15 ]
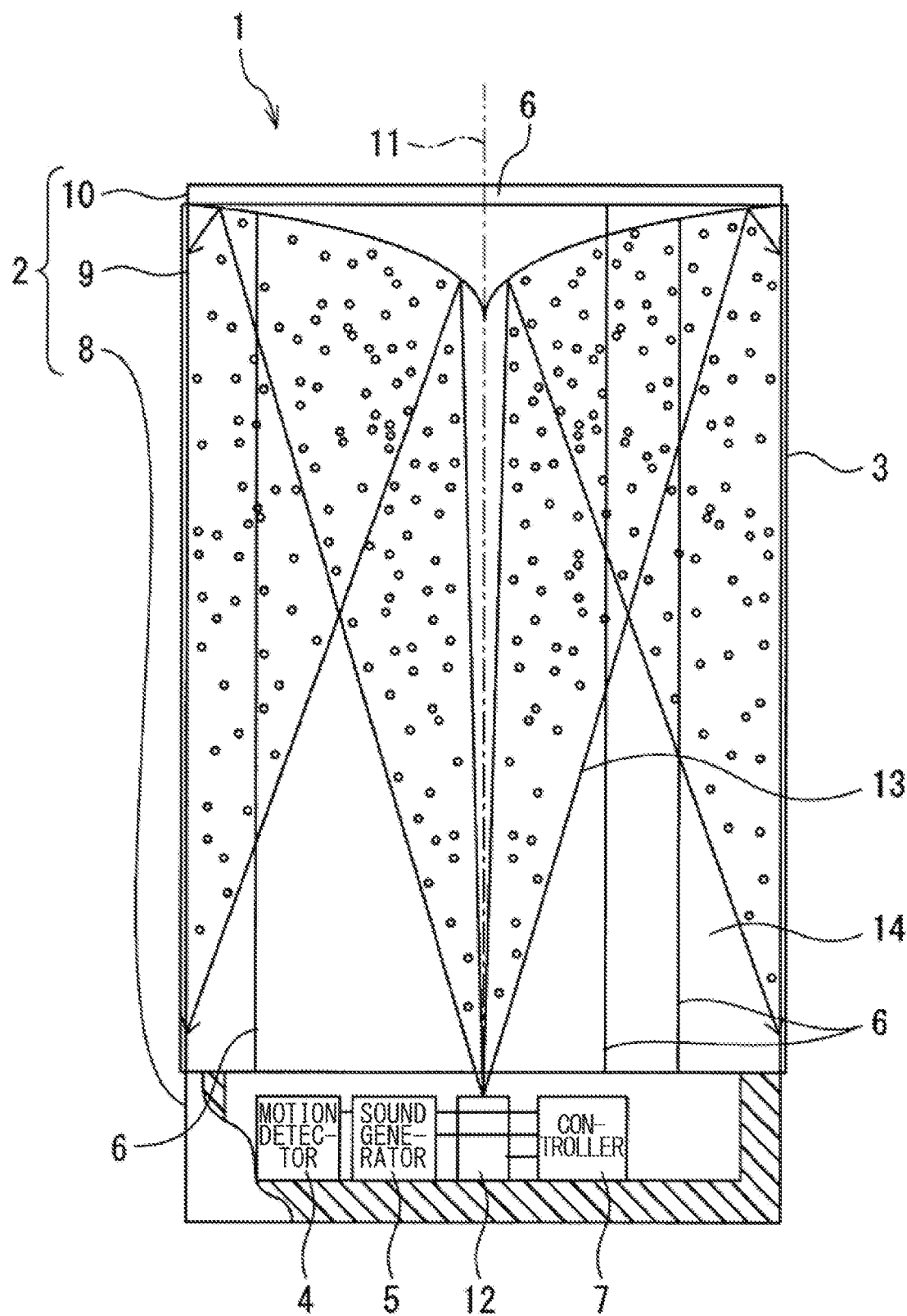

[ FIG. 16 ]
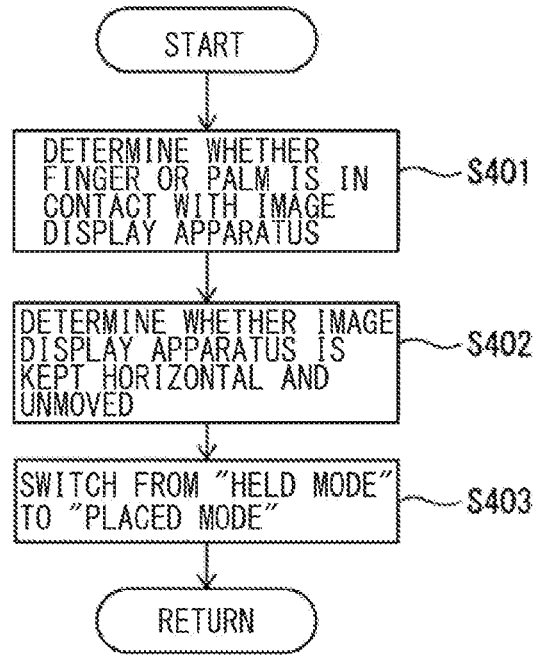
[ FIG. 17 ]
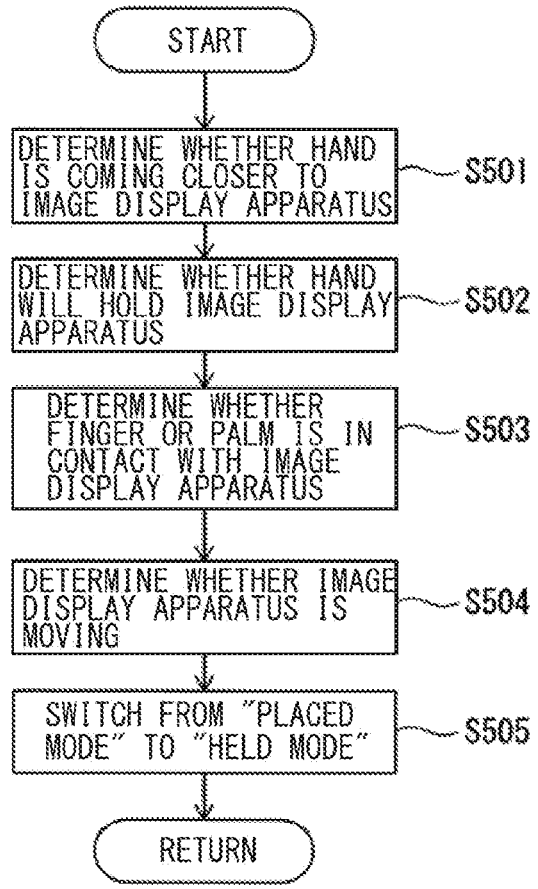

[ FIG. 18 ]
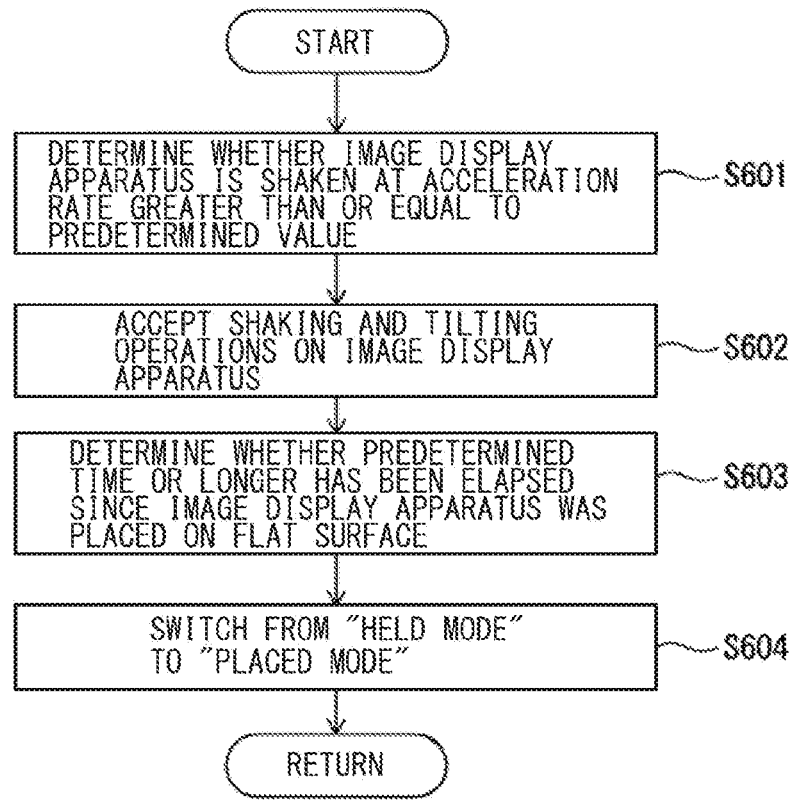

IMAGE DISPLAY APPARATUS FOR ENHANCED INTERACTION WITH A USER

CROSS REFERENCE TO RELATED APPLICATIONS

This application is a U.S. National Phase of International Patent Application No. PCT/JP2020/028274 filed on Jul. 21, 2020, which claims priority benefit of Japanese Patent Application No. JP 2019-196086 filed in the Japan Patent Office on Oct. 29, 2019. Each of the above-referenced applications is hereby incorporated herein by reference in its entirety.

TECHNICAL FIELD

The technology relates to an image display apparatus.

BACKGROUND

An image display apparatus has been proposed that includes a cylindrical screen, a substantially circular mirror, and a color projector. The cylindrical screen and the substantially circular mirror are laminated on a cylindrical pedestal. The color projector is provided at the center of the pedestal such that the optical axis is directed vertically upward to scan laser beams corresponding to RGB colors (see PTL 1, for example). For the image display apparatus described in PTL 1, the color projector outputs laser beams vertically upward in a radial manner, and the outputted laser beams are reflected from the reflecting mirror toward the entire circumference of the screen in a radial manner. The screen receiving the reflected laser beams on the entire circumference displays a three-dimensional image of the three-dimensional object in a space defined by the screen. The three-dimensional object is visible from multiple directions around the image display apparatus.

CITATION LIST

Patent Literature

[PTL 1] International Publication No. WO 2018/163945

SUMMARY OF THE INVENTION

Problems to be Solved by the Invention

Such an image display apparatus has been required not only to display a three-dimensional image but also provide appropriate interaction with a user.

An object of the disclosure is to provide an image display apparatus that makes it possible to provide more appropriate interaction with a user.

Means for Solving the Problem

An image display apparatus of the disclosure includes: (a) a display displaying a three-dimensional image in such a manner that the three-dimensional object looks as if being in a space defined by a member constituting an external surface and that the three-dimensional object is visible from multiple directions around the display; (b) a motion detector detecting the motion of the display itself caused by an external force; (c) a motion calculation unit calculating the motion of the three-dimensional object caused by the motion of the display itself on the basis of the motion detected by the motion detector on the assumption that the three-dimensional object is actually present in the space; (d) a display control unit changing the three-dimensional image displayed on the display on the basis of the result of calculation by the motion calculation unit; (e) a force sense presentation unit presenting the sense of force to the user of an own apparatus; and (f) a force sense control unit causing the force sense presentation unit to present the sense of force on the basis of the result of calculation by the motion calculation unit.

BRIEF DESCRIPTION OF THE DRAWINGS

FIG. 1 is a diagram illustrating an overall configuration of an image display apparatus according to an embodiment.

FIG. 2 is a diagram illustrating the image display apparatus displaying a three-dimensional image.

FIG. 3 is a diagram illustrating an internal configuration of a controller.

FIG. 4 is a flowchart illustrating details of control processing.

FIG. 5 is a diagram illustrating an operation of the image display apparatus according to a modification example.

FIG. 6 is a diagram illustrating an operation of the image display apparatus according to a modification example.

FIG. 7 is a diagram illustrating an operation the image display apparatus according to a modification example.

FIG. 8 is a flowchart illustrating details of the control processing according to a modification example.

FIG. 9 is a diagram illustrating an operation of the image display apparatus according to a modification example.

FIG. 10 is a diagram illustrating an operation of an image display apparatus according to a modification example.

FIG. 11 is a flowchart illustrating details of the control processing according to a modification example.

FIG. 12 is a diagram illustrating an operation of an image display apparatus according to a modification example.

FIG. 13 is a diagram illustrating an operation of the image display apparatus according to a modification example.

FIG. 14 is a diagram illustrating an overall configuration of the image display apparatus according to a modification example.

FIG. 15 is a diagram illustrating an overall configuration of the image display apparatus according to a modification example.

FIG. 16 is a flowchart illustrating details of the control processing according to a modification example.

FIG. 17 is a flowchart illustrating details of the control processing according to a modification example.

FIG. 18 is a flowchart illustrating details of the control processing according to a modification example.

MODES FOR CARRYING OUT THE INVENTION

An exemplary image display apparatus according to an embodiment of the disclosure will now be described with reference to FIGS. 1 to 18. The embodiment of the disclosure is described in the order described below. It is to be noted that the disclosure should not be limited to the examples described below. Additionally, effects described herein are merely illustrative and not restrictive, and other effects may be made.

1. Embodiment: Image Display Apparatus
   1-1 Overall Configuration of Image Display Apparatus
   1-2 Details of Control processing
   1-3 Modification Example

1. Embodiment

1-1 Overall Configuration of Image Display Apparatus

An image display apparatus 1 according to an embodiment of the disclosure will now be described. The image display apparatus 1 according to the embodiment displays a three-dimensional image of a three-dimensional object 15 in such a manner that the three-dimensional image of the three-dimensional object 15 is visible from multiple directions around the three-dimensional image. As illustrated in FIG. 2, the image display apparatus 1 also has a character display function that displays a character as the three-dimensional object 15. The image display apparatus 1 is small enough to be held in one hand of a user, as illustrated in FIG. 5.

As illustrated in FIG. 1, the image display apparatus 1 according to the image display apparatus 1 includes a display 2, an input operation detector 3, a motion detector 4, a sound generator 5, a force sense presentation unit 6, and a controller 7. In FIG. 1, a pedestal 8 is illustrated as being partially broken to make the interior of the pedestal 8 visible.

The pedestal 8 has an open top side and a closed bottom side. The display 2 is formed by laminating a cylindrical screen 9 and a substantially circular reflecting mirror 10 in this order on the open top side of the pedestal 8.

At the interior center of the pedestal 8, an emitter 12 is provided. The emitter has an optical axis 11 directed vertically upward. The emitter 12 may be, for example, a color projector that scans laser beams corresponding to RGB colors (hereinafter also referred to as "image light 13") to display pixels. Further, the emitter 12 outputs the image light 13 for forming the three-dimensional image radially upward in accordance with a signal from the controller 7 to cause the outputted image light 13 to reflect from the reflecting mirror 10 to the screen 9. The three-dimensional image may be, for example, an image visible as if the three-dimensional object 15 were present in a space 14 defined by the screen 9.

The screen 9 may be, for example, a hologram screen that displays the three-dimensional image by outputting the incident image light 13 in a diffusional manner. For example, the screen 9 may be a transmissive hologram disclosed in International Publication No. WO 2018/163945 which is transparent. As illustrated in FIG. 2, the transparent hologram allows the rear side of the image display apparatus 1 to be visible in the area where the three-dimensional image of the three-dimensional object 15 is not displayed. This makes the user feel as if the screen 9 were a transparent glass container. In FIG. 2, a tono-sama penguin character is illustrated as the three-dimensional object 15.

The reflecting mirror 10 may be a mirror whose bottom surface is a reflecting surface from which the image light 13 outputted from the emitter 12 is reflected. The reflecting mirror 10 radially reflects the image light 13 outputted radially upward from the emitter 12 to the entire circumference of the screen 9.

In the display 2 having the configuration described above, the emitter 12 outputs the image light 13 radially upward in accordance with the signal from the controller 7 as illustrated in FIG. 1, and the outputted image light 13 is radially reflected by the reflecting mirror 10 to the entire circumference of the screen 9. When the reflected image light 13 reaches the entire circumference of the screen 9, the three-dimensional image visible as if being present in the space 14 defined by the screen 9 is displayed and in such a manner that the three-dimensional image is visible from multiple directions around the image display apparatus 1, as illustrated in FIG. 2. This makes the user feel as if the screen 9 were a transparent container made of glass or the like and the three-dimensional object 15 were accommodated in the container. Accordingly, it is possible to display a three-dimensional image without using a special device such as a head mounted display that bothers the user when mounting.

It is to be noted that although the space 14 is a space defined by the screen 9 having a cylindrical shape in the embodiment, another configuration may be employed. The space 14 only has to be a space defined by a member that constitutes an external surface protruding outward. The space 14 may be, for example, a space defined by the screen 9 having a semi-cylindrical shape or a square tubular shape.

The input operation detector 3 detects an operation input performed by the user. The input operation detector 3 outputs a detection result to the controller 7. The input operation detector 3 may be, for example, at least one of a touch panel that is provided on the external surface of the display 2, a microphone that picks up surrounding sounds of the display 2, a camera that captures surrounding images of the display 2, or a distance image sensor that captures surrounding distance images of the display 2 (e.g., a time of flight (TOF) camera). In the following description of the embodiment, the input operation detector 3 is a touch panel, and the "input operation detector 3" is thus also referred to as a "touch panel 3". The touch panel 3 is provided on the entire outer circumference of the screen 9 and detects the presence or absence of a finger or the like in contact with the touch panel 3 and the coordinates of the contact position. The touch panel 3 may be operable by a plurality of operation methods, including a flick operation and a pointing operation.

The motion detector 4 is provided inside the pedestal 8, and detects the motions of the display 2 itself caused by an external force. The external force may be, for example, a force shaking the display 2 up and down in the directions parallel to the optical axis 11. The motions of the display 2 itself may be, for example, upward and downward motions of the display 2. Data on the motions is outputted to the controller 7. The motion detector 4 may be, for example, an acceleration sensor that detects acceleration rates in three-directions, i.e., X, Y, and Z directions. In a case where the motion detector 4 is the acceleration sensor, the data on the motions may be the acceleration rates.

The sound generator 5 is provided inside the pedestal 8, and outputs sounds or the like in association with motions of the three-dimensional object 15 to the surroundings of the display 2 in accordance with signals from the controller 7. The sound generator 5 may be, for example, an omnidirectional speaker (i.e., 360° speaker).

The force sense presentation unit 6 is provided inside the pedestal 8, and presents the user of the image display apparatus 1 (own apparatus) senses of force or the like in association with the motions of the three-dimensional object 15 in accordance with signals from the controller 7. The force sense presentation unit 6 may be, for example, a force sense presentation device that generates a force having a desired magnitude, a force directed in a desired direction, and a rotational force, by controlling the angular momenta of a plurality of rotors. For example, a hybrid interface disclosed in Japanese Unexamined Patent Application Publication No. 2005-190465 may be provided by controlling the rotational directions, the rotation speeds, and the phases of two eccentric rotors. The hybrid interface presents a vibration with a desired direction, a desired intensity, and a desired frequency, a rotational force, and a sense of force.

According to the hybrid interface, the phases of the two eccentric rotors are controlled by rotating the eccentric rotors in opposite directions in a synchronized manner, to synthesize a force in linear simple harmonic motion in a desired direction. This enables presentation of the sense of shock at a collision.

The controller 7 is provided inside the pedestal 8, and provided with hardware sources such as a storage device 16 and a processor 17, as illustrated in FIG. 3.

The storage device 16 stores a control program for controlling the image display apparatus 1. The control program is executable by the processor 17. The storage device 16 also stores various pieces of data necessary for the execution of the control program.

The processor 17 implements a display control unit 18, a mode switching unit 19, a motion calculation unit 20, a force sense control unit 21, and a sound control unit 22 in accordance with the control program stored in the storage device 16. Additionally, the processor 17 causes the display control unit 18, the mode switching unit 19, the motion calculation unit 20, the force sense control unit 21, and the sound control unit 22 to output signals for respectively controlling the image light 13, the sound, and the sense of force to the emitter 12, the sound generator 5, and the force sense presentation unit 6 on the basis of the motion data regarding the display 2 itself outputted from the motion detector 4. The processor 17 thereby executes control processing for facilitating the interaction between the user and the image display apparatus 1. The display control unit 18 includes a display operation unit 23.

1-2 Details of Control Processing

The control processing executed by the display control unit 18, the mode switching unit 19, the motion calculation unit 20, the force sense control unit 21, and the sound control unit 22 that are implemented by the processor 17 will now be described. The control processing is executed when a non-illustrated power switch of the image display apparatus 1 is turned on.

First, as illustrated in Step S101 of FIG. 4, the display control unit 18 outputs a signal for causing the display 2 to output the image light 13 for displaying a three-dimensional image to the emitter 12. At this time, the three-dimensional object 15 is displayed at a central area of the space 14 without being in contact with the top and bottom ends of the space 14, so that the bottom face of the three-dimensional object 15 is visible for the user. This makes the user feel as if the three-dimensional object 15 were floating in the space 14.

Thereafter, the processing proceeds to Step S102 in which the mode switching unit 19 determines whether the display 2 is held in the hand of the user. Specifically, the detection result outputted from the touch panel 3 is acquired first. Thereafter, it is determined whether the palm or fingers are in contact with the touch panel 3 on the basis of the acquired detection result (e.g., information on the coordinates of contact positions of the fingers or the like). If it is not determined that the fingers or the like are in contact with the touch panel 3, the display 2 is determined not to be held in the hand of the user (No), and the processing proceeds to Step S103. In contrast, if it is determined that the fingers or the like are in contact with the touch panel 3, the display 2 is determined to be held in the hand of the user (Yes), and the processing proceeds to Step S104.

In Step S103, the mode switching unit 19 switches the mode of the image display apparatus 1 to a "placed mode".

In the "placed mode", the display operation unit 23 outputs a signal for changing the three-dimensional image displayed on the display 2 on the basis of a flick operation or a pointing operation performed on the touch panel 3 to the emitter 12. Specifically, the detection result outputted from the touch panel 3 is acquired first. Thereafter, it is determined whether a flick operation or a pointing operation has been performed on the basis of the acquired detection result. Then, if it is determined that a flick operation has been performed, image data on the three-dimensional image for rotating the three-dimensional object 15 in the direction of the flick operation are sequentially generated. If it is determined that a touch operation is performed while the three-dimensional object 15 is rotating, image data on the three-dimensional image for stopping the rotation of the three-dimensional object 15 are generated.

In contrast, if it is determined that a pointing operation has been performed, the display operation unit 23 sequentially generates image data on the three-dimensional image for causing the three-dimensional object 15 to perform an operation corresponding to the position specified by the pointing operation. At the same time, the generated image data are sequentially converted into data of the image light 13, and signals for causing emission of the image light 13 indicated by the data acquired as the result of conversion are sequentially outputted to the emitter 12. This flow including generating the image data on the three-dimensional image, converting into the data of the image light 13, and outputting the signals to the emitter 12 is repeated until the display 2 is held in the hand. When the display 2 is held in the hand, the processing returns to Step S102. At this time, the three-dimensional object 15 is kept displayed at the central area of the space 14 of the display 2 without being in contact with the top and bottom ends of the space 14. This makes the user feel as if the three-dimensional object 15 were floating in the space 14.

In Step S104, the mode switching unit 19 determines whether the display 2 is held and shaken in the hand of the user. Specifically, the motion data outputted from the motion detector 4 is acquired first. Thereafter, it is determined whether the magnitude of the vibration of the display 2 is greater than or equal to a predetermined threshold on the basis of the acquired data. Then, if it is determined that the magnitude of the vibration of the display 2 is less than the predetermined threshold, the display 2 is not determined to be held in the hand (No), and the processing proceeds to Step S105. In contrast, if it is determined that the magnitude of the vibration of the display 2 is greater than or equal to the predetermined threshold, the display 2 is determined to be held in the hand (Yes), and the processing proceeds to Step S106.

In Step S105, the mode switching unit 19 switches the mode of the image display apparatus 1 to a "held mode". In the "held mode", the display operation unit 23 outputs a signal for changing the three-dimensional image displayed on the display 2 to the emitter 12 on the basis of a flick operation performed on the touch panel 3. Specifically, the detection result outputted from the touch panel 3 is acquired first. Thereafter, it is determined whether a flick operation has been performed on the basis of the acquired detection result. Then, if it is determined that a flick operation has been performed, image data on the three-dimensional image for rotating the three-dimensional object 15 in the direction of the flick operation are sequentially generated. At the same time, the generated image data are sequentially converted into data of the image light 13, and signals for causing emission of the image light 13 indicated by the data acquired as the result of conversion are sequentially outputted to the emitter 12. That is, when the display 2 is held in the hand, the display operation unit 23 changes the three-dimensional image displayed on the display 2 only on the basis of the detection result of an input operation performed by one (a flick operation) of the operation methods of the touch panel 3. Accordingly, unlike in the case of the "placed mode" in Step S103, only a flick operation is accepted and a pointing operation is not accepted in the "held mode".

This flow including generating the image data on the three-dimensional image, converting into the data of the image light 13, and outputting the signals to the emitter 12 is repeated until the display 2 is placed or shaken. When the display 2 is placed or shaken, the processing returns to Step S102. At this time, the three-dimensional object 15 is kept displayed at the central area of the space 14 without being in contact with the top and bottom ends of the space 14. This makes the user feel as if the three-dimensional object 15 were floating in the space 14.

It is to be noted that although the image data on the three-dimensional image for rotating the three-dimensional object 15 in the direction of the flick operation are sequentially generated in Step S105 in the embodiment, another configuration may be employed. For example, it may be determined whether it is immediately after the display 2 is held in the user, i.e., whether it is immediately after the switching of the determination in Step S102 from "No" to "Yes". If it is determined that it is immediately after the switching, the image data on the three-dimensional image for indicating the three-dimensional object 15 (e.g., the tono-sama penguin character) in a surprised state are sequentially generated.

In Step S106, in contrast, the mode switching unit 19 switches the mode of the image display apparatus 1 to a "shaken mode". In the "shaken mode", the motion calculation unit 20 calculates the motion of the three-dimensional object 15 caused by the motion of the display 2 itself on the assumption that the three-dimensional object 15 is actually present in the space 14 of the display 2. Specifically, the motion of the three-dimensional object 15 at the time when the display 2 performs the motion indicated by the data is calculated on the basis of the motion data acquired in Step S104 and substance data of the three-dimensional object 15 in accordance with a predetermined physical law. The substance data of the three-dimensional object 15 may be, for example, the mass, center of gravity, density, volume, Young's modulus, Poisson's ratio, vibration damping rate, viscosity, and outer shape of the three-dimensional object 15. Additionally, the predetermined physical law may be, for example, the law of inertia, the law of motion, the law of action and reaction, the law of conservation of energy, the law of universal gravitation, or the Newton's law of viscosity. The motion of the three-dimensional object 15 may be, for example, the position, the moving speed, the presence or absence of a collision with the top or bottom end of the space 14, or the bouncing speed after the collision of the three-dimensional object 15.

Accordingly, when the display 2 held in the hand of the user is swung down in such a condition that the optical axis 11 of the display 2 is directed in the vertical direction, for example, the motions of the three-dimensional object 15 including an upward motion of the three-dimensional object 15 in the space 14, a collision of the three-dimensional object 15 with the top end of the space 14 due to the inertia, and a bouncing motion of the three-dimensional object caused by the shock of the collision are calculated. When the display 2 is swung up afterward in such a condition that the optical axis 11 of the display 2 is directed in the vertical direction, for example, the motions of the three-dimensional object 15 including a downward motion of the three-dimensional object 15 in the space 14 due to the inertia, a collision of the three-dimensional object 15 with the bottom end of the space 14, and a bouncing motion of the three-dimensional object 15 caused by the shock of the collision are calculated. Accordingly, when the swinging up and down operations of the display 2 held in the hand are repeated, the above-described calculations of the motions of the three-dimensional object 15 are repeated.

At the same time, the display control unit 18 outputs a signal for changing the three-dimensional image on the basis of the result of calculation by the motion calculation unit 20 to the emitter 12. Specifically, the image data on the three-dimensional image are sequentially generated in accordance with the calculated motions of the three-dimensional object 15 so that the motions of the three-dimensional object 15 caused by the motions of the display 2 itself are displayed. If it is determined that the three-dimensional object 15 will collide with the top or bottom end of the space 14 as the result of the calculation, the image data on the three-dimensional image representing the three-dimensional object 15 colliding with the top or bottom end of the space 14 are generated. At the same time, the generated image data are sequentially converted into data of the image light 13, and signals for causing emission of the image light 13 indicated by the data acquired as the result of conversion are sequentially outputted to the emitter 12. Accordingly, unlike in the case of Steps S103 and S105, only the shaking operation on the display 2 held in the hand is accepted, and a flick operation and a pointing operation are not accepted. That is, when the display 2 held in the hand is shaken, the display control unit 18 prohibits the three-dimensional image from changing on the basis of the result of detection by the touch panel 3.

Accordingly, when swinging up and down operations of the display 2 held in the hand of the user are repeated, the display 2 repeatedly displays the three-dimensional images representing the three-dimensional object 15 moving upward in the space 14 to collide with the top end of the space 14 and moving downward in the space 14 to collide with the bottom end of the space 14. That is, unlike in the case of Steps S101, S103, and S105, the three-dimensional object 15 is not kept floating in the air, but is brought into the state based on the result of calculation by the motion calculation unit 20.

In this case, the sound control unit 22 outputs a signal for generating a sound on the basis of the result of calculation by the motion calculation unit 20 to the sound generator 5. Specifically, a signal for generating a sound (e.g., a collision sound or a voice "Stop!") in accordance with the motion of the three-dimensional object 15 acquired as the result of the calculation is outputted to the sound generator 5, so that the sound of the three-dimensional object 15 is generated on the basis of the motion of the display 2 itself. The method of calculating the collision sound may be, for example, the method described in Japanese Unexamined Patent Application Publication No. 2009-205626. Japanese Unexamined Patent Application Publication No. 2009-205626 describes the method using a 3D model of the three-dimensional object 15 and the physical property such as the hardness of the three-dimensional object 15.

At the same time, the force sense control unit 21 outputs a signal for presenting the sense of force based on the result of calculation by the motion calculation unit 20 to the force sense presentation unit 6. Specifically, the force sense control unit 21 outputs, to the force sense presentation unit 6, a signal for presenting the sense of force in accordance with the motion of the three-dimensional object 15 calculated on the assumption that the three-dimensional object 15 (e.g., the tono-sama penguin character) is actually present in the space 14. This makes the user of the image display apparatus 1 (the own apparatus) feel the vibration supposed to be generated when the three-dimensional object 15 comes into contact with the member (e.g., the pedestal 8, the screen 9, or the reflecting mirror 10) constituting the external surface of the space 14.

The flow including generating the image data on the three-dimensional image, converting into the data of the image light 13, and outputting the signals to the emitter 12, and the flow including outputting to the sound generator 5 and the force sense presentation unit 6 are repeated until the shaking operation of the display 2 is stopped. When the shaking operation is stopped, the processing returns to Step S102.

It is to be noted that although the image display apparatus 1 according to the embodiment has the character display function of displaying the tono-sama penguin character as the three-dimensional object 15 as illustrated in FIG. 2, another configuration may be employed. For example, the image display apparatus 1 may have a product display function of displaying a commercial product from a shopping site as the three-dimensional object 15, as illustrated in FIG. 5. FIG. 5 illustrates the image display apparatus 1 displaying a fountain pen that is a commercial product from a shopping site as the three-dimensional object 15. It is to be noted that, in a case where an item such as a fountain pen is used as the three-dimensional object 15, the three-dimensional image representing how the item is broken may be displayed on the basis of the speed or the acceleration rate of the shaking operation on the display 2, unlike in the case where a character is used as the three-dimensional object 15.

Alternatively, as illustrated in FIG. 6, for example, the image display apparatus 1 may have a musical instrument function of causing the three-dimensional object 15 to serve as a musical instrument when the image display apparatus 1 is used for a musical performance. FIG. 6 illustrates the image display apparatus 1 displaying a handbell that is one example of musical instruments as the three-dimensional object 15.

As described above, the image display apparatus 1 according to the embodiment of the disclosure calculates the motions of the three-dimensional object 15 caused by the motions of the display 2 itself on the assumption that the three-dimensional object 15 is actually present in the space 14. Further, the three-dimensional image displayed on the display 2 is changed on the basis of the calculated motion of the three-dimensional object 15. Additionally, the force sense presentation unit 6 presents the sense of force on the basis of the calculated motion of the three-dimensional object 15. Accordingly, when the display 2 held in the hand is swung up and down, for example, the three-dimensional images and the senses of force representing the motions of the three-dimensional object 15 (e.g., the tono-sama penguin, fountain pen, or handbell) are provided in association with the upward and downward motions of the space 14. This makes the user instinctively recognize the weight, hardness, or the like of the three-dimensional object 15. Accordingly, it is possible to provide the image display apparatus 1 that makes it possible to provide more appropriate interaction with a user.

Further, the image display apparatus 1 according to the embodiment of the disclosure changes the three-dimensional image on the basis of the calculated motion of the three-dimensional object 15 so that the motion of the three-dimensional object 15 caused by the display 2 itself is displayed. Additionally, the force sense presentation unit 6 presents the sense of force on the basis of the motion of the three-dimensional object 15 calculated on the assumption that the three-dimensional object 15 is actually present in the space 14. This makes the user feel the vibration supposed to be generated when the three-dimensional object 15 comes into contact with the member constituting the external surface. Accordingly, it is possible to provide the sense of force supposed to be generated on the assumption that the three-dimensional object 15 comes into contact with the pedestal 8, the screen 9, or the reflecting mirror 10. This makes the user feel as if the three-dimensional object 15 were present in the space 14.

Further, the image display apparatus 1 according to the embodiment of the disclosure calculates the motion of the three-dimensional object 15 on the basis of the substance data of the three-dimensional object 15 (e.g., at least one of the mass, center of gravity, density, volume, Young's modulus, Poisson's ratio, vibration damping rate, viscosity, or outer shape) and the motion detected by the motion detector 4. Accordingly, when a commercial product (e.g., a fountain pen) from a shopping site is displayed as the three-dimensional object 15 as illustrated in FIG. 5, for example, the three-dimensional image and the sense of force are provided that accurately represent the mass or the like of the commercial product (e.g., the fountain pen), making the user instinctively recognize the weight, hardness, or the like of the commercial product (e.g., the fountain pen). This is effective for the user (i.e., purchaser) who wants to know the physical properties of the commercial product before purchase. This also decreases in returns of products, resulting in a cost reduction for stores. Such a decrease in returns of products also reduces the transport loads on forwarding agencies.

Further, the image display apparatus 1 according to the embodiment of the disclosure changes the three-dimensional image displayed on the display 2 on the basis of the result of detection of the input operation by the input operation detector 3. This allows the three-dimensional object 15 to rotate in a direction desired by the user, for example.

Further, the input operation detector 3 in the image display apparatus 1 according to the embodiment of the disclosure is at least one of a touch panel that is provided on the external surface of the display 2, a microphone that picks up surrounding sounds of the display 2, a camera that captures surrounding images of the display 2, or a distance image sensor that captures surrounding distance images of the display 2. This allows various input operations to be performed, such as a touching operation of fingers, a sound operation, and a gesture operation.

Further, according to the image display apparatus 1 of the embodiment of the disclosure, the single input operation detector 3 is operable by a plurality of operation methods. While the display 2 is held in the hand, the three-dimensional image displayed on the display 2 is changed only on the basis of the result of detection of an input operation performed by one of the operation methods. Accordingly, when the user holds the display 2 with the hand to view the three-dimensional object 15 from all directions of 360°, for example, only flick operations are accepted. This prevents the three-dimensional object from changing in response to a pointing operation that the user unintentionally performed on the input operation detector 3. It is thus possible to prevent the three-dimensional object 15 from making unintended motions.

Additionally, according to the image display apparatus 1 of the embodiment of the disclosure, while the display 2 held in the hand is shaken, the three-dimensional image is prohibited from changing on the basis of the result of detection by the input operation detector 3. Accordingly, it is possible to more certainly prevent the three-dimensional object 15 from making unintended motions.

1-3 Modification Examples (1) Although the display 2 is shaken in the directions parallel to the optical axis 11 in the embodiment, another configuration may be employed. For example, the display 2 may be shaken in directions crossing the optical axis as illustrated in FIG. 7. In FIG. 7, a toy having a large ring connected with small rings is displayed as the three-dimensional object 15.

(2) Further, although the display control unit 18 changes the three-dimensional image displayed on the display 2 only on the basis of the result of detection of an input operation performed by one of the operation methods in the "held" mode in the embodiment, another configuration may be employed. For example, the three-dimensional image displayed on the display 2 may be changed only on the basis of the result of detection of an input operation with the highest priority by the input operation detector 3.

In such a configuration, when input operations performed by some operation methods (e.g., a flick operation and a pointing operation) are detected, the display control unit 18 may change the three-dimensional image displayed on the display 2 only on the basis of an input operation performed by an operation method with the highest priority (e.g., the flick operation), for example. Further, the priorities assigned to the operation methods may differ between when the display 2 is shaken (Step S104 "Yes" in FIG. 4) and when the display 2 is not shaken (Step S104 "No" in FIG. 4). For example, when the display 2 is not shaken, the priority of the flick operation may be set higher than the priority of the pointing operation, whereas when the display 2 is shaken, the priority of the pointing operation may be set higher than the priority of the flick operation.

According to the image display apparatus 1 of the modification example as described above, when input operations performed by some operation methods are detected, the three-dimensional image displayed on the display 2 is changed only on the basis of the input operation performed by the operation method with the highest priority. Additionally, the priorities assigned to the operation methods differ between when the display 2 is shaken and when the display 2 is not shaken. Accordingly, even when an input operation is mistakenly performed by an operation method with a low priority together with an operation input performed by an operation method with a high priority, for example, only the input operation performed by the operation method with the high priority is valid, and the input operation performed by the operation method with the low priority is invalid. This prevents an unintended operation from being performed.

(3) Further, although the image display apparatus 1 has the character display function or the product display function in the embodiment, another configuration may be employed. For example, the image display apparatus 1 may have a learning assist function of representing behaviors of the three-dimensional object 15 at the time when the substance data on the substance constituting the three-dimensional object 15 (e.g., the viscosity of a liquid) is changed. In a case where the image display apparatus 1 has the learning assist function, Step S105 of the control processing illustrated in FIG. 4 may be replaced with Step S201 in the "held mode", as illustrated in FIG. 8, for example. Further, in the following description of the modification example, the substance constituting the three-dimensional object 15 is a liquid, as illustrated in FIG. 9, and the "three-dimensional object 15" is thus also referred to as a "liquid 15".

In Step S201, the motion calculation unit 20 calculates the motion of the liquid 15 caused by the motion of the display 2 itself on the assumption that the liquid 15 is actually present in the space 14 of the display 2. Specifically, the motion of the liquid 15 at the time when the display 2 performs the motion indicated by the data is calculated on the basis of the motion data acquired in Step S104 and the substance data on the liquid 15 in accordance with the predetermined physical law. Accordingly, when the display 2 held in the hand and tilted such that the longitudinal direction is directed to the right direction, for example, the motions of the liquid 15 including a rightward motion of the liquid 15 in the space 14 due to the gravity, a collision of the liquid 15 with the right end of the space 14, and a bouncing motion of the liquid 15 caused by the shock of the collision are calculated. Thereafter, when the display 2 held in the hand and tilted such that the longitudinal direction is directed to the left direction, the motions of the liquid 15 including a leftward motion of the liquid 15 in the space 14 due to the gravity, a collision of the liquid 15 with the left end of the space 14, and a bouncing motion of the liquid 15 caused by the shock of the collision are calculated. Accordingly, when operations for tilting the display 2 held in the hand to the right and left are repeated, the calculation of the motions of the liquid 15 described above are repeated.

At the same time, the display control unit 18 outputs a signal for changing the three-dimensional image on the basis of the result of calculation by the motion calculation unit 20 to the emitter 12. Specifically, the image data on the three-dimensional image in accordance with the motion of the liquid 15 acquired as the result of the calculation are sequentially generated so that the motion of the liquid 15 caused by the motion of the display 2 itself is displayed. At the same time, the generated image data are sequentially converted into the data on the image light 13, and signals for causing emission of the image light 13 indicated by the data acquired as the result of conversion are sequentially outputted to the emitter 12.

Accordingly, when the operations for tilting the display 2 held in the hand of the user to the right and left are repeated, the three-dimensional images representing the liquid 15 moving rightward in the space 14 to collide with the right end of the space 14 and moving leftward in the space 14 to collide with the left end of the space 14 are repeatedly displayed. That is, the state of the liquid 15 is decided on the basis of the result of calculation by the motion calculation unit 20.

The motion of the liquid 15 is calculated using a predetermined physical law, such as the Newton's law of viscosity. Thus, in a case where the liquid 15 is a fluid having a high viscosity, such as starch syrup, the three-dimensional image representing the liquid 15 deforming slowly is displayed. In a case where the liquid 15 is a fluid having a low viscosity, in contrast, the three-dimensional image representing the liquid 15 deforming quickly is displayed.

At the same time, the sound control unit 22 outputs a signal for generating a sound on the basis of the result of calculation by the motion calculation unit 20 to the sound generator 5. Specifically, the sound control unit 22 outputs, to the sound generator 5, a signal for generating a sound in accordance with the motion of the liquid 15 acquired as the result of the calculation so that a sound of the liquid 15 caused by the motion of the display 2 itself is generated. The sound in accordance with the motion of the liquid 15 may be, for example, a collision sound or a wave sound.

Further, the force sense control unit 21 outputs a signal for presenting the sense of force based on the result of calculation by the motion calculation unit 20 to the force sense presentation unit 6. Specifically, the force sense control unit 21 outputs, to the force sense presentation unit 6, a signal for presenting the sense of force in accordance with the motion of the liquid 15 calculated on the assumption that the liquid 15 is actually present in the space 14. This makes the user of the image display apparatus 1 (the own apparatus) feel the vibration supposed to be generated when the liquid 15 comes into contact with the member constituting the external surface of the space 14 (e.g., the pedestal 8, the screen 9, or the reflecting mirror 10).

These signals are repeatedly outputted to the emitter 12, the sound generator 5, and the force sense presentation unit 6 until the display 2 is placed or shaken. When the display 2 is placed or shaken, the processing returns to Step S102.

As described above, the image display apparatus 1 according to the modification example calculates the motion of the three-dimensional object 15 so that the three-dimensional object 15 moving on the basis of the substance data of the three-dimensional object 15 and the motion detected by the motion detector 4 in accordance with the predetermined physical law is displayed. Accordingly, when the liquid having a predetermined viscosity is displayed as the three-dimensional object 15 as illustrated in FIG. 9, for example, the three-dimensional image representing the flow of the liquid depending on the viscosity and the sense of force in association with the motion of the liquid are presented. This helps a user who learns the viscosity.

It is to be noted that although the display 2 is tilted to the right or left by the user in the modification example, another configuration may be employed. For example, the display 2 may be turned upside down.

Further, although the processing proceeds to Step S201 of FIG. 8 when the display 2 is held in the hand of the user and is not shaken as in Steps S102 and S104 of FIG. 8 in the modification example, another configuration may be employed. For example, when the substance data (e.g., the viscosity) of the three-dimensional object 15 is set using another device such as a smartphone, the processing may proceed to Step S201 of FIG. 8. In this configuration, when the setting of the substance data of the three-dimensional object 15 is erased (initialized) using the other device, Step S201 of FIG. 8 may be stopped repeating and the processing may return to Step S102.

Further, although the behaviors of the liquid 15 are displayed with the learning assist function as illustrated in FIG. 9 in the modification example, another configuration may be employed. For example, as illustrated in FIG. 10, a creature illustrated on an opened page of a picture book may be displayed in cooperation with the picture book. FIG. 10 illustrates the image display apparatus 1 displaying a butterfly as the three-dimensional object 15.

(4) Further, the image display apparatus 1 may have a motion display function of displaying the result of simulation of motion of a snow globe at the time when the display 2 is tapped by a finger, for example. In a case where the image display apparatus 1 has the motion display function, Step S105 of the control processing illustrated in FIG. 4 may be replaced with Step S301 in the "held mode", as illustrated in FIG. 11, for example. Further, in the following description of the modification example, the three-dimensional object 15 is snow as illustrated in FIG. 12, and the "three-dimensional object 15" is thus also referred to as "snow 15".

In Step S301, the motion calculation unit 20 calculates the motion of the snow 15 caused by the motion of the display 2 itself on the assumption that the snow 15 is actually present in the space 14 of the display 2. Specifically, the position of the touch panel 3 in contact with a finger is detected on the basis of the result of detection acquired from the touch panel 3. Thereafter, the motions of the snow 15 at the time when the touch panel 3 is tapped by the finger at a portion in contact with the finger and when the display 2 performs the motion indicated by the data are calculated on the basis of the detected position, the motion data acquired in Step S104, and the substance data of the snow 15 in accordance with a predetermined physical law. Accordingly, when the display 2 is tapped by the finger of the user, for example, the motions of the snow 15 including blowing up of the snow 15 from the tapped portion and piling up of the snow 15 are calculated. In this case, the amount of the snow 15 blowing up increases as the motion of the display 2 itself becomes larger.

Further, the display control unit 18 outputs a signal for changing the three-dimensional image on the basis of the result of calculation by the motion calculation unit 20 to the emitter 12. Specifically, the image data on the three-dimensional image in accordance with the motion of the snow 15 acquired as the result of the calculation are sequentially generated so that the motion of the snow 15 caused by the motion of the display 2 itself is displayed. At the same time, the generated image data are sequentially converted into the data on the image light 13, and signals for causing emission of the image light 13 indicated by the data acquired as the result of conversion are sequentially outputted to the emitter 12.

Accordingly, when the display 2 is tapped by the user, the three-dimensional image representing the snow 15 blowing up in the space 14 due to a vibration caused by the tapping is displayed on the display 2.

At the same time, the sound control unit 22 outputs a signal for generating a sound on the basis of the result of calculation by the motion calculation unit 20 to the sound generator 5. Specifically, the sound control unit 22 outputs, to the sound generator 5, a signal for generating a sound in accordance with the motion of the snow 15 acquired as the result of the calculation so that a sound of the snow 15 (e.g., a sound of the snow 15 blowing up or piling up) caused by the motion of the display 2 itself is generated.

At the same time, the force sense control unit 21 outputs a signal for presenting the sense of force based on the result of calculation by the motion calculation unit 20 to the force sense presentation unit 6. Specifically, the force sense control unit 21 outputs, to the force sense presentation unit 6, a signal for presenting the sense of force in accordance with the motion of the snow 15 calculated on the assumption that the snow 15 is actually present in the space 14. This makes the user of the image display apparatus 1 (the own apparatus) feel the vibration supposed to be generated when the snow 15 comes into contact with the member constituting the external surface of the space 14 (e.g., the pedestal 8, the screen 9, or the reflecting mirror 10).

These signals are repeatedly outputted to the emitter 12, the sound generator 5, and the force sense presentation unit 6 until the display 2 is placed or shaken. When the display 2 is placed or shaken, the processing returns to Step S102.

Note that, although the three-dimensional image representing the snow 15 blowing up is displayed when the display 2 is tapped by a finger in the modification example, another configuration may be employed. For example, the three-dimensional image representing the snow 15 blowing up may be displayed when another operation is performed, such as when the display 2 is tilted, when the display 2 is blown by a blast of air, when a portion of the image display apparatus 1 is flipped by a finger, or when a physical force is exerted on the image display apparatus 1.

Additionally, when the display 2 is tapped, for example, the three-dimensional image of an object of various kinds, such as a snow flower or a snow fairy may be displayed at the tapped position.

As described above, the image display apparatus 1 according to the modification example detects the position of the touch panel 3 in contact with a finger, and changes the three-dimensional image displayed on the display 2 on the basis of the detected position. Accordingly, when snow is displayed as the three-dimensional object 15 as illustrated in FIG. 12, for example, it is possible to provide the three-dimensional image of the snow blowing up from the tapped position and the sense of force in association with the blowing snow. This reproduces a snow globe more appropriately.

(5) Further, the image display apparatus 1 may be used when the user want to see current conditions of a distant area, for example: The image display apparatus 1 may have an actual-space cutting-out display function of displaying live camera images captured by a drone hovering over the distant area. The drone hovering over a distant area may be, for example, a submarine drone moving in a coral sea, as illustrated in FIG. 13. When the image display apparatus 1 having the actual-space cutting-out display function is moved in parallel, the location imaged by the submarine drone may be shifted in the same direction by the same distance. This allows the image display apparatus 1 to display the three-dimensional image of a desired location in the sea.

(6) Further, although the controller 7 is provided inside the pedestal 8 to be integrated with the display 2 in the embodiment, another configuration may be employed. For example, the controller 7 may be provided outside the pedestal 8 to be separated from the display 2. Separating the controller 7 from the display 2 allows the controller 7 to have a larger size.

(7) Further, although the three-dimensional image is displayed by emitting the image light 13 to the cylindrical screen 9 in the embodiment, another configuration may be employed. For example, the three-dimensional image is displayed on an cubic apparatus provided with a liquid crystal display on each face, for example.

(8) Further, although the display 2 displays the three-dimensional image viewable from all directions of 360° around the display 2 in the embodiment, another configuration may be employed. For example, the three-dimensional image may be viewable within an angular range less than 360°.

(9) Further, although the force sense presentation unit 6 is the force sense presentation device that displays the sense of force by controlling the angular momenta of the rotors in the embodiment, another configuration may be employed. For example, a linear actuator may be used that presents the sense of force by generating vibrations. In this case, the force sense presentation units 6 may be respectively provided inside the pedestal 8 and the reflecting mirror 10, as illustrated in FIG. 14. Providing the respective force sense presentation units 6 inside the pedestal 8 and the reflecting mirror 10 makes it possible to present a more realistic sense of force using vibrations.

Further, in a case of the force sense presentation unit 6 presenting the sense of force using vibrations, a plurality of the force sense presentation units 6 each in a linear shape may be provided on the external surface of the display 2, as illustrated in FIG. 15, for example. The liner force sense presentation unit 6 may be, for example, a linear actuator that generates a vibration at a desired position out of a plurality of positions defined on (the line of) the force sense presentation unit 6. With the configuration in which the plurality of linear force sense presentation units 6 are provided, it is possible to generate a vibration at a position of the screen 9 where the three-dimensional object 15 collides, as illustrated in FIG. 7. Additionally, it is possible to reproduce the propagation of the vibration generated at the collision position along the external surface of the display 2. This achieves more realistic presentation of the sense of force.

(10) Further, although any one of the "placed mode", the "held mode", and the "shaken mode" is selected on the basis of the result of determination as to whether the display 2 is held in the hand of the user and whether the display 2 is shaken as in Steps S102 and S104 of FIG. 4 in the embodiment, another configuration may be employed. For example, the "held mode" may be switched to the "placed mode" when it is determined that no contact of fingers or a palm with the image display apparatus 1 is detected and that no upward nor downward motion (displacement) of the display 2 is detected. Specifically, the mode switching unit 19 determines whether contact of fingers or a palm with the touch panel 3 is detected on the basis of the detection result outputted from the touch panel 3, as illustrated in FIG. 16 (Step S401). Thereafter, if it is determined that no contact is detected, it is determined whether requirements that the bottom face of the image display apparatus 1 is kept horizontal and that display 2 is not moved in any direction are satisfied on the basis of the detection results outputted from a non-illustrated gyroscope sensor and the motion detector 4 (Step S402). If the requirements described above are determined to be satisfied, the mode is switched from the "held mode" to the "placed mode" (Step S403).

In contrast, if it is determined that a hand is coming closer to the image display apparatus 1 to hold the image display apparatus 1, and thereafter if it is determined that the image display apparatus 1 is held in the hand, the "placed mode" may be switched to the "held mode". Specifically, as illustrated in FIG. 17, the mode switching unit 19 determines whether a hand is coming closer to the image display apparatus 1 on the basis of the detection result outputted from a non-illustrated camera (Step S501). Thereafter, if it is determined that a hand is coming closer to the image display apparatus 1, it is determined whether the hand coming closer to the image display apparatus 1 will hold the image display apparatus 1 (Step S502). Thereafter, if it is determined that the hand will hold the image display apparatus 1, the touch panel 3 is brought into the state irresponsive to operations such as flick operations and pointing operations. Thereafter, it is determined whether a palm or fingers are in contact with the image display apparatus 1 on the basis of the detection result outputted from the touch panel 3 (Step S503). Thereafter, if it is determined that a palm or fingers are in contact with the image display apparatus 1, it is determined in which direction the image display apparatus 1 is moving on the basis of the detection result outputted from the motion detector 4 (Step S504). Then, if it is determined that the image display apparatus 1 is moving in any direction, the mode is switched from the "placed mode" to the "held mode" (Step S505).

Further, if it is determined that an acceleration rate greater than or equal to a predetermined value has been applied to the image display apparatus 1, for example, the "held mode" may be switched to the "shaken mode". Specifically, as illustrated in FIG. 18, the mode switching unit 19 determines whether the image display apparatus 1 has been shaken at an acceleration rate greater than or equal to the predetermined value preliminarily determined on the basis of the detection result outputted from the motion detector 4 (Step S601). Thereafter, if it is determined that the image display apparatus 1 has been shaken, the image display apparatus 1 is brought into a state where operations for shaking or tilting the image display apparatus 1 are acceptable (Step S602). If it is determined that these operations have been performed in such a state, the three-dimensional image is changed so that the three-dimensional object 15 deviates from the central portion of the space 14 of the display 2 and moves in association with the motion of the display 2 itself (Step S603). In contrast, if it is not determined that these operations have been performed, the three-dimensional image is changed so that the three-dimensional object 15 moving at the bottom portion of the space 14 in accordance with a predetermined physical law is displayed (Step S603). Thereafter, it is determined that predetermined time (e.g., one minute) preliminarily determined has been elapsed since the bottom face of the pedestal 8 of the image display apparatus 1 was placed on a flat surface, the three-dimensional image is changed so that the three-dimensional object 15 returns to the central portion of the space 14 of the display 2 (Step S603). The mode is then switched from the "held mode" to the "placed mode" (Step S604).

Further, if it is determined that the display 2 has not been moved by an external force, i.e., no acceleration rate has not been detected, for a preliminarily determined predetermined time or longer while the image display apparatus 1 is in the "shaken mode", the "shaken mode" may be switched to the "held mode". Further, the mode of the image display apparatus 1 may be selected using another device such as a smartphone, for example. Further, the image display apparatus 1 may be provided with three mode switch buttons respectively corresponding to the "placed mode", the "held mode", and the "shaken mode", for example. When any of the three mode switch buttons is pressed down, it may be determined that the mode corresponding to the mode switch button pressed down has been selected.

(11) Further, although the "placed mode", the "held mode", and the "shaken mode" are exemplified as the modes of the image display apparatus 1 in the embodiment, another configuration may be employed. For example, the image display apparatus 1 may be switched to a "sleep mode" in which displaying of the three-dimensional image is restricted to save power or to protect user's privacy when a preliminarily determined predetermined time has been elapsed since the last operation (e.g., operation for holding up shaking the image display apparatus 1) was performed on the image display apparatus 1. For example, in a case where the three-dimensional object 15 is the tono-sama penguin character, the three-dimensional image representing the character in a sleeping state may be displayed on the display 2 in the "sleep mode". Alternatively, three-dimensional image representing animation such as a screen saver may be displayed on the display 2, for example. If it is determined that the user is approaching the image display apparatus 1 or that an operation has been performed on the image display apparatus 1 in the "sleep mode", the image display apparatus 1 may be returned to the mode immediately before the switching to the "sleep mode".

It is to be noted that the technology may have the following configurations.

(1) An image display apparatus including:
   a display displaying a three-dimensional image in such a manner that the three-dimensional object looks as if being in a space defined by a member constituting an external surface and that the three-dimensional object is visible from multiple directions around the display;
   a motion detector detecting a motion of the display itself caused by an external force;
   a motion calculation unit calculating a motion of the three-dimensional object caused by the motion of the display itself on the basis of the motion detected by the motion detector on the assumption that the three-dimensional object is actually present in the space;
   a display control unit changing the three-dimensional image displayed on the display on the basis of a result of calculation by the motion calculation unit;
   a force sense presentation unit presenting a sense of force to a user of an own apparatus; and
   a force sense control unit causing the force sense presentation unit to present the sense of force on the basis of the result of calculation by the motion calculation unit.

(2) The image display apparatus according to (1) described above, in which
   the display control unit changes the three-dimensional image on the basis of the result of calculation by the motion calculation unit to display the motion of the three-dimensional object caused by the motion of the display itself, and
   the force sense control unit causes the force sense presentation unit to display the sense of force on the basis of the result of calculation by the motion calculation unit on the assumption that the three-dimensional object is actually present in the space to make the user feel a vibration supposed to be generated by contact of the three-dimensional object with the member constituting the external surface.

(3) The image display apparatus according to (1) or (2) described above, in which
   substance data indicating at least one of a mass, a center of gravity, a density, a volume, a Young's modulus, a Poisson's ratio, a vibration damping rate, a viscosity, or an outer shape is set to the three-dimensional object, and
   the motion calculation unit calculates the motion of the three-dimensional object on the basis of the substance data and the motion detected by the motion detector in accordance with a predetermined physical low.

(4) The image display apparatus according to any one of (1) to (3) described above, further including an input operation detector detecting an input operation performed by the user, in which
the display control unit further includes a display operation unit that changes the three-dimensional image displayed on the display on the basis of a result of detection of the input operation.
(5) The image display apparatus according to (4) described above, in which the input operation detector is at least one of a touch panel provided on the external surface of the display, a microphone picking up surrounding sounds of the display, a camera capturing surrounding images of the display, or a distance image sensor capturing surrounding distance images of the display.
(6) The image display apparatus according to (5) described above, in which
the input operation detector is the touch panel, and
the display operation unit detects a position of the touch panel in contact with a finger, and changes the three-dimensional image displayed on the display on the basis of the position detected.
(7) The image display apparatus according to any one of (4) to (6) described above, in which
a single piece of the input operation detector has a plurality of operation methods, and
the display operation unit changes the three-dimensional image displayed on the display only on the basis of the result of detection of an input operation performed by one of the plurality of operation methods when the display is held in a hand.
(8) The image display apparatus according to (7) described above, in which the display operation unit prohibits the three-dimensional image from changing on the basis of the result of detection detected by the input operation detector when the display is held in the hand.
(9) The image display apparatus according to any one of (4) to (6) described above, in which
a single piece of the input operation detector has a plurality of operation methods,
when input operations performed by the plurality of operation methods are detected, the display operation unit changes the three-dimensional image displayed on the display only on the basis of a result of detection of an input operation performed by a method with a highest priority out of the input operations detected, and
priorities assigned to the operation methods differ between when the display is shaken and when the display is not shaken.

REFERENCE SIGNS LIST

1 . . . image display apparatus, 2 . . . display, 3 . . . touch panel, 4 . . . motion detector, 5 . . . sound generator, 6 . . . point, 6 . . . force sense presentation unit, 7 . . . point, 7 . . . controller, 8 . . . pedestal, 9 . . . screen, 10 . . . reflecting mirror, 11 . . . optical axis, 12 . . . emitter, 13 . . . image light, 14 . . . space, 15 . . . three-dimensional object, 16 . . . storage device, 17 . . . processor, 18 . . . display control unit, 19 . . . mode switching unit, 20 . . . motion calculation unit, 21 . . . force sense control unit, 22 . . . sound control unit, 23 . . . display operation unit

The invention claimed is:

1. An image display apparatus, comprising:
a display configured to display a three-dimensional image in such a manner that a three-dimensional object looks as if in a space defined by a member constituting an external surface and that the three-dimensional object is visible from multiple directions around the display;
a motion detector configured to detect a first motion of the display caused by an external force;
a motion calculation unit configured to calculate, a second motion of the three-dimensional object caused by the first motion of the display, based on the detected first motion on an assumption that the three-dimensional object is actually present in the space;
a display control unit configured to change the three-dimensional image displayed on the display based on the calculated second motion;
a force sense presentation unit configured to present a sense of force to a user of the image display apparatus; and
a force sense control unit configured to output, to the force sense presentation unit, a signal to present the sense of force based on the calculated second motion.

2. The image display apparatus according to claim 1, wherein
the display control unit is further configured to change the three-dimensional image based on the calculated second motion to display the second motion of the three-dimensional object caused by the first motion of the display, and
the force sense control unit is further configured to output, to the force sense presentation unit, the signal to present the sense of force based on the calculated second motion on the assumption that the three-dimensional object is actually present in the space to make the user feel a vibration supposed to be generated by contact of the three-dimensional object with the member constituting the external surface.

3. The image display apparatus according to claim 1, wherein
substance data indicating at least one of a mass, a center of gravity, a density, a volume, a Young's modulus, a Poisson's ratio, a vibration damping rate, a viscosity, or an outer shape is set to the three-dimensional object, and
the motion calculation unit is further configured to calculate the second motion of the three-dimensional object based on the substance data, the detected first motion, and a specific physical law.

4. The image display apparatus according to claim 1, further comprising an input operation detector configured to detect an input operation by the user, wherein
the display control unit includes a display operation unit, and
the display operation unit is configured to change the three-dimensional image displayed on the display based on the detected input operation.

5. The image display apparatus according to claim 4, wherein the input operation detector comprises at least one of a touch panel on the external surface of the display, a microphone picking up surrounding sounds of the display, a camera capturing surrounding images of the display, or a distance image sensor capturing surrounding distance images of the display.

6. The image display apparatus according to claim 5, wherein the display operation unit is further configured to:
   detect a position of the touch panel in contact with a finger; and
   change the three-dimensional image displayed on the display based on the detected position.

7. The image display apparatus according to claim 4, wherein
   a single piece of the input operation detector has a plurality of operation methods, and
   the display operation unit is further configured to change the three-dimensional image displayed on the display based on the detected input operation by one of the plurality of operation methods when the display is held in the hand of the user.

8. The image display apparatus according to claim 7, wherein
   the display operation unit is further configured to prohibit the three-dimensional image from changing based on the detected input operation when the display is held in the hand.

9. The image display apparatus according to claim 4, wherein
   a single piece of the input operation detector has a plurality of operation methods,
   when a plurality of input operations by the plurality of operation methods are detected, the display operation unit is further configured to change the three-dimensional image displayed on the display based on an input operation of the plurality of input operations by a first operation method, of the plurality of operation methods, with a highest priority, and
   priorities assigned to the plurality of operation methods differ between when the display is shaken and when the display is not shaken.

10. The image display apparatus according to claim 1, wherein the second motion includes at least one of a collision of the three-dimensional object with a top end of the space or a bouncing motion of the three-dimensional object.

* * * * *